(12) United States Patent
Gasiorek et al.

(10) Patent No.: US 12,719,885 B2
(45) Date of Patent: Aug. 25, 2026

(54) SYSTEMS AND METHODS FOR DETECTING MALICIOUS EVENTS

(71) Applicant: Secureworks Corp., Wilmington, DE (US)

(72) Inventors: Radoslaw Gasiorek, Edingburgh (GB); John M. Nicholas, Fairfax, VA (US); Raul Garcia Calvo, Seville (ES)

(73) Assignee: Sophos Inc., Dallas, TX (US)

( * ) Notice: Subject to any disclaimer, the term of this patent is extended or adjusted under 35 U.S.C. 154(b) by 178 days.

(21) Appl. No.: 17/951,448

(22) Filed: Sep. 23, 2022

(65) Prior Publication Data

US 2024/0106838 A1 Mar. 28, 2024

(51) Int. Cl.
*H04L 9/40* (2022.01)

(52) U.S. Cl.
CPC ...... *H04L 63/1416* (2013.01); *H04L 63/1425* (2013.01); *H04L 63/20* (2013.01)

(58) Field of Classification Search
CPC .. H04L 63/1416; H04L 63/1425; H04L 63/20
See application file for complete search history.

(56) References Cited

U.S. PATENT DOCUMENTS 5,937,066 A 8/1999 Gennaro et al.
6,357,010 B1 3/2002 Viets et al.
7,269,578 B2 9/2007 Sweeney
7,331,061 B1 2/2008 Ramsey et al.
7,492,957 B1 2/2009 Bonhaus et al.
7,548,932 B2 6/2009 Horvitz et al.
7,555,482 B2 6/2009 Korkus
7,571,474 B2 8/2009 Ross et al.
(Continued)

FOREIGN PATENT DOCUMENTS

EP 3599753 A1 1/2020
EP 3262815 10/2020
(Continued)

OTHER PUBLICATIONS

Notification, International Search Report and the Written Opinion of the International Search Authority regarding related Application No. PCT/US23/31278 dated Nov. 30, 2023.
(Continued)

*Primary Examiner* — Henry Tsang
*Assistant Examiner* — Judy Bazna
(74) *Attorney, Agent, or Firm* — IP Spring

(57) ABSTRACT

A method and system for detecting malicious threat activity or event sequences is disclosed. In an embodiment, the method may include generating one or more malicious sequence detection rules defined in a domain specific language. The method may include generating a rules repository configured to receive and store one or more pre-defined rules and one or more curated sets of malicious sequence detection rules. The method may include monitoring networks and/or computing devices to detect malicious threat activity or event sequences based on the one or more curated sets of malicious sequence detection rules. The method may include aggregating malicious threat activity or event sequences detected within a predetermined time frame and generating a threat score and, if the threat score exceeds a threshold score, generating an alert.

20 Claims, 6 Drawing Sheets

(56) References Cited

U.S. PATENT DOCUMENTS 7,594,270 B2 9/2009 Church et al.
7,606,801 B2 10/2009 Faitelson et al.
7,613,722 B2 11/2009 Horvitz et al.
7,770,031 B2 8/2010 MacKay et al.
7,841,008 B1 11/2010 Cole
7,856,411 B2 12/2010 Darr
7,926,113 B1 4/2011 Gula et al.
8,037,529 B1 10/2011 Chiueh
8,079,081 B1 12/2011 Lavrik et al.
8,082,506 B1 12/2011 McConnell
8,122,495 B2 2/2012 Ramsey et al.
8,156,553 B1 4/2012 Church et al.
8,327,419 B1 12/2012 Korablev et al.
8,407,335 B1 3/2013 Church et al.
8,490,193 B2 7/2013 Sarraute et al.
8,490,196 B2 7/2013 Lucangeli et al.
8,522,350 B2 8/2013 Davenport et al.
8,539,575 B2 9/2013 Schmitlin et al.
8,578,393 B1 11/2013 Fisher
8,595,170 B2 11/2013 Gladstone et al.
8,621,618 B1 12/2013 Ramsey et al.
8,701,176 B2 4/2014 Ramsey et al.
8,793,786 B2 7/2014 Bhesania et al.
8,805,881 B2 8/2014 Hom et al.
8,832,048 B2 9/2014 Lim
8,839,414 B2 9/2014 Mantle et al.
8,898,777 B1 11/2014 Oliver
8,909,673 B2 12/2014 Faitelson et al.
8,928,476 B2 1/2015 Jerhotova et al.
8,931,095 B2 1/2015 Ramsey et al.
8,938,802 B2 1/2015 Davenport et al.
8,959,115 B2 2/2015 Marathe
8,984,644 B2 3/2015 Oliphant et al.
9,009,828 B1 4/2015 Ramsey et al.
9,032,478 B2 5/2015 Ballesteros et al.
9,046,886 B2 6/2015 Chong et al.
9,047,336 B2 6/2015 Hom et al.
9,058,492 B1 6/2015 Satish
9,069,599 B2 6/2015 Martinez et al.
9,098,702 B2 8/2015 Rubin et al.
9,129,105 B2 9/2015 Donley et al.
9,130,988 B2 9/2015 Seifert et al.
9,137,262 B2 9/2015 Qureshi et al.
9,191,400 B1 11/2015 Ptasinski et al.
9,195,809 B1 11/2015 Kaplan
9,275,231 B1 3/2016 Chen
9,298,895 B2 3/2016 Lim
9,319,426 B2 4/2016 Webb et al.
9,338,134 B2 5/2016 Yin
9,338,180 B2 5/2016 Ramsey et al.
9,430,534 B2 8/2016 Bhattacharya et al.
9,438,563 B2 9/2016 Yin
9,438,623 B1 9/2016 Thioux
9,519,756 B2 12/2016 Bitran et al.
9,544,273 B2 1/2017 Fleury et al.
9,548,994 B2 1/2017 Pearcy et al.
9,558,352 B1 1/2017 Dennison et al.
9,560,062 B2 1/2017 Khatri et al.
9,560,068 B2 1/2017 Figlin et al.
9,596,252 B2 3/2017 Coates et al.
9,628,511 B2 4/2017 Ramsey et al.
9,667,656 B2 5/2017 Banerjee et al.
9,667,661 B2 5/2017 Sharma et al.
9,690,938 B1 6/2017 Saxe et al.
9,692,778 B1 6/2017 Mohanty
9,710,672 B2 7/2017 Braun
9,712,549 B2 7/2017 Almurayh
9,742,559 B2 8/2017 Christodorescu et al.
9,767,302 B2 9/2017 Lim
9,792,443 B1 10/2017 Sheridan
9,805,202 B2 10/2017 Medeiros et al.
9,825,989 B1 11/2017 Mehra
9,910,986 B1 3/2018 Saxe et al.
9,934,376 B1 4/2018 Ismael
9,973,524 B2 5/2018 Boyer et al.
9,998,480 B1 6/2018 Gates
10,038,706 B2 7/2018 Mekky
10,050,992 B2 8/2018 Thyni et al.
10,063,582 B1 8/2018 Feng et al.
10,114,954 B1 10/2018 Bellis
10,116,500 B1 10/2018 Long et al.
10,218,733 B1 2/2019 Amidon
10,270,790 B1 4/2019 Jackson
10,277,625 B1 4/2019 Efstathopoulos
10,311,231 B1 6/2019 Kayyoor et al.
10,348,747 B2 7/2019 Yamada
10,356,125 B2 7/2019 Goutal et al.
10,382,473 B1 8/2019 Ashkenazy
10,382,489 B2 8/2019 Das et al.
10,419,903 B2 9/2019 Singh et al.
10,425,223 B2 9/2019 Roth et al.
10,454,950 B1 10/2019 Aziz
10,474,813 B1 11/2019 Ismael
10,474,820 B2 11/2019 Manadhata
10,491,632 B1 11/2019 Natarajan et al.
10,521,584 B1 12/2019 Sharifi Mehr
10,558,809 B1 2/2020 Joyce
10,567,407 B2 2/2020 Tang et al.
10,594,713 B2 3/2020 McLean
10,601,865 B1 3/2020 Mesdaq et al.
10,642,753 B1 5/2020 Steinberg
10,691,810 B1 6/2020 Freitag
10,726,127 B1 7/2020 Steinberg
10,728,263 B1 7/2020 Neumann
10,735,470 B2 8/2020 Vidas et al.
10,754,958 B1 8/2020 Sidagni
10,762,206 B2 9/2020 Titonis et al.
10,785,238 B2 9/2020 McLean et al.
10,834,128 B1 11/2020 Rajogopalan et al.
10,841,337 B2 11/2020 Kinder
10,853,431 B1 12/2020 Lin et al.
10,855,717 B1 12/2020 Feiman
10,868,825 B1 12/2020 Dominessy
10,915,828 B2 2/2021 Qhi
10,944,758 B1 3/2021 Nagargadde
10,986,144 B1 * 4/2021 Lee .................... H04L 65/4015
11,003,718 B2 5/2021 McLean et al.
11,038,920 B1 6/2021 Sellers
11,044,263 B2 6/2021 McLean et al.
11,113,086 B1 9/2021 Steinberg
11,140,193 B2 10/2021 Patel
11,165,862 B2 11/2021 Austin et al.
11,275,831 B1 3/2022 Aouad et al.
11,310,268 B2 4/2022 Bowditch et al.
11,381,589 B2 7/2022 Tassoumt et al.
11,418,524 B2 8/2022 Urbanski et al.
11,552,979 B1 1/2023 Soudhamma
11,562,076 B2 1/2023 El-Moussa
11,693,972 B2 7/2023 Nunes
11,757,907 B1 9/2023 Berger
11,863,577 B1 1/2024 Miseiko
2002/0129135 A1 9/2002 Delany et al.
2002/0199122 A1 12/2002 Davis
2004/0128543 A1 7/2004 Blake
2004/0193912 A1 9/2004 Li et al.
2005/0015382 A1 1/2005 Aaron
2005/0060295 A1 3/2005 Gould et al.
2005/0138204 A1 6/2005 Iyer et al.
2005/0138413 A1 6/2005 Lippmann
2005/0166072 A1 7/2005 Converse
2005/0288939 A1 12/2005 Peled et al.
2006/0012815 A1 1/2006 Ebner et al.
2006/0021046 A1 1/2006 Cook
2006/0021048 A1 1/2006 Cook
2006/0037076 A1 2/2006 Roy
2006/0195575 A1 8/2006 Delany et al.
2006/0253447 A1 11/2006 Judge
2007/0067848 A1 3/2007 Gustave
2007/0143852 A1 6/2007 Keanini
2007/0169199 A1 7/2007 Quinnell
2007/0192867 A1 8/2007 Miliefsky
2007/0226248 A1 9/2007 Darr
2007/0226807 A1 9/2007 Ginter et al.
2007/0294756 A1 12/2007 Fetik

(56) References Cited

U.S. PATENT DOCUMENTS

2008/0077593 A1 3/2008 Abrams et al.
2008/0219334 A1 9/2008 Brainos et al.
2008/0255997 A1 10/2008 Bluhm et al.
2008/0262991 A1 10/2008 Kapoor et al.
2008/0301798 A1 12/2008 Hao
2008/0320000 A1 12/2008 Gaddam
2009/0038015 A1 2/2009 Diamant
2009/0113550 A1 4/2009 Costa
2009/0198682 A1 8/2009 Buehler et al.
2010/0083374 A1 4/2010 Schmitlin et al.
2010/0125913 A1 5/2010 Davenport et al.
2010/0251329 A1 9/2010 Wei et al.
2011/0004771 A1 1/2011 Matsushima et al.
2011/0179492 A1 7/2011 Markopoulou et al.
2011/0197056 A1 8/2011 Chen
2011/0276604 A1 11/2011 Hom et al.
2011/0276716 A1 11/2011 Coulson et al.
2012/0072983 A1 3/2012 McCusker et al.
2012/0117640 A1 5/2012 Ramsey et al.
2012/0151594 A1 6/2012 McClure et al.
2012/0185275 A1 7/2012 Loghmani
2012/0222122 A1 8/2012 Das
2012/0233699 A1 9/2012 Jajodia
2012/0246730 A1 9/2012 Raad
2012/0254333 A1 10/2012 Chandramouli et al.
2012/0260341 A1 10/2012 Chan et al.
2013/0074054 A1 3/2013 Johnson
2013/0074188 A1 3/2013 Giakouminakis et al.
2013/0104191 A1 4/2013 Peled et al.
2013/0138428 A1 5/2013 Chandramouli et al.
2013/0173620 A1 7/2013 Takenouchi
2013/0226938 A1 8/2013 Risher et al.
2013/0238319 A1 9/2013 Minegishi et al.
2013/0282746 A1 10/2013 Balko et al.
2013/0291103 A1 10/2013 Davenport et al.
2013/0318604 A1 11/2013 Coates et al.
2014/0041028 A1 2/2014 Ramsey et al.
2014/0047544 A1 2/2014 Jakobsson
2014/0047545 A1 2/2014 Sidagni
2014/0051432 A1 2/2014 Gupta et al.
2014/0137257 A1 5/2014 Martinez
2014/0143863 A1 5/2014 Deb et al.
2014/0165195 A1 6/2014 Brdiczka et al.
2014/0165204 A1 6/2014 Williams
2014/0181981 A1 6/2014 Christodorescu
2014/0215629 A1 7/2014 Raz et al.
2014/0222712 A1 8/2014 Samaha et al.
2014/0223555 A1 8/2014 Sanz Hernando et al.
2014/0283081 A1 9/2014 Sheridan
2014/0283083 A1 9/2014 Gula
2014/0331207 A1 11/2014 Sridharan
2014/0373151 A1 12/2014 Webb et al.
2015/0019323 A1 1/2015 Goldberg et al.
2015/0040225 A1 2/2015 Coates et al.
2015/0074390 A1 3/2015 Stoback et al.
2015/0135287 A1 5/2015 Medeiros et al.
2015/0135320 A1 5/2015 Coskun
2015/0156212 A1 6/2015 Khatri et al.
2015/0186618 A1 7/2015 Poorvin et al.
2015/0222652 A1 8/2015 Ramsey et al.
2015/0271047 A1 9/2015 McLean
2015/0310211 A1 10/2015 Mei et al.
2015/0324457 A1 11/2015 McLean
2015/0332054 A1 11/2015 Eck
2015/0365437 A1 12/2015 Bell, Jr.
2016/0006749 A1 1/2016 Cohen et al.
2016/0014140 A1 1/2016 Akireddy et al.
2016/0014151 A1 1/2016 Prakash
2016/0078365 A1 3/2016 Baumard
2016/0099963 A1 4/2016 Mahaffey et al.
2016/0112445 A1 4/2016 Abramowitz
2016/0134653 A1 5/2016 Vallone
2016/0139886 A1 5/2016 Perdriau et al.
2016/0156655 A1 6/2016 Lotem et al.
2016/0162690 A1 6/2016 Reith
2016/0182546 A1 6/2016 Coates et al.
2016/0205127 A1 7/2016 Roehl
2016/0241591 A1 8/2016 Ramsey et al.
2016/0248789 A1 8/2016 Nakamatsu
2016/0253497 A1 9/2016 Christodorescu
2016/0277423 A1 9/2016 Apostolescu et al.
2016/0313709 A1 10/2016 Biesdorf et al.
2016/0337400 A1 11/2016 Gupta
2016/0342805 A1 11/2016 Lim
2016/0378978 A1 12/2016 Singla et al.
2017/0026343 A1 1/2017 Wardman
2017/0026391 A1 1/2017 Abu-Nimeh
2017/0063893 A1 3/2017 Franc et al.
2017/0063905 A1 3/2017 Muddu et al.
2017/0093902 A1 3/2017 Roundy et al.
2017/0098087 A1 4/2017 Li
2017/0111379 A1 4/2017 Khatri et al.
2017/0111384 A1* 4/2017 Loureiro ............. H04L 63/1433
2017/0126710 A1* 5/2017 De-Levie ............ H04L 63/1425
2017/0140295 A1 5/2017 Bandara
2017/0142149 A1 5/2017 Coates et al.
2017/0169154 A1 6/2017 Lin et al.
2017/0171228 A1 6/2017 McLean
2017/0180418 A1 6/2017 Shen et al.
2017/0201381 A1 7/2017 Kinder et al.
2017/0201431 A1 7/2017 Kinder et al.
2017/0201490 A1 7/2017 Kinder et al.
2017/0201548 A1 7/2017 Kinder et al.
2017/0208084 A1 7/2017 Steelman et al.
2017/0208085 A1 7/2017 Steelman et al.
2017/0243004 A1 8/2017 Kinder et al.
2017/0243005 A1 8/2017 Kinder et al.
2017/0243009 A1 8/2017 Sejpal
2017/0244734 A1 8/2017 Kinder et al.
2017/0244750 A1 8/2017 Kinder et al.
2017/0244754 A1 8/2017 Kinder et al.
2017/0244762 A1 8/2017 Kinder et al.
2017/0318033 A1 11/2017 Holland et al.
2017/0318034 A1 11/2017 Holland et al.
2017/0346839 A1 11/2017 Peppe
2017/0359368 A1 12/2017 Hodgman et al.
2018/0004948 A1* 1/2018 Martin ................ H04L 63/1425
2018/0069885 A1 3/2018 Patterson
2018/0077189 A1 3/2018 Doppke et al.
2018/0077195 A1 3/2018 Gathala
2018/0089574 A1 3/2018 Goto
2018/0091306 A1 3/2018 Antonopoulos et al.
2018/0096140 A1 4/2018 Bulygin
2018/0103010 A1 4/2018 Diaz Cuellar et al.
2018/0124073 A1 5/2018 Scherman et al.
2018/0124085 A1 5/2018 Frayman et al.
2018/0124092 A1 5/2018 Pope
2018/0124094 A1 5/2018 Hamdi
2018/0129811 A1 5/2018 Diu
2018/0152480 A1 5/2018 Kinder et al.
2018/0181599 A1 6/2018 Crabtree et al.
2018/0219899 A1 8/2018 Joy
2018/0234434 A1 8/2018 Viljoen
2018/0270126 A1* 9/2018 Tapia ...................... H04L 41/16
2018/0288198 A1 10/2018 Pope et al.
2018/0324203 A1 11/2018 Estes
2018/0367550 A1 12/2018 Musuvathi et al.
2019/0014149 A1 1/2019 Cleveland et al.
2019/0037406 A1 1/2019 Wash
2019/0050554 A1 2/2019 Fiske
2019/0052663 A1 2/2019 Lee et al.
2019/0068630 A1 2/2019 Valecha et al.
2019/0095320 A1 3/2019 Biswas et al.
2019/0095801 A1 3/2019 Saillet et al.
2019/0102554 A1 4/2019 Luo et al.
2019/0102564 A1 4/2019 Li
2019/0102646 A1 4/2019 Redmon et al.
2019/0104154 A1 4/2019 Kumar et al.
2019/0109717 A1 4/2019 Reddy
2019/0122258 A1 4/2019 Bramberger et al.
2019/0132344 A1 5/2019 Lem et al.
2019/0166149 A1 5/2019 Gerrick
2019/0166152 A1 5/2019 Steele
2019/0173919 A1 6/2019 Irimie et al.

(56) References Cited

U.S. PATENT DOCUMENTS

2019/0242718 A1 8/2019 Siskind et al.
2019/0258807 A1 8/2019 DiMaggio et al.
2019/0297096 A1 9/2019 Ahmed et al.
2019/0311121 A1 10/2019 Martin
2019/0342296 A1 11/2019 Anandam et al.
2019/0347423 A1 11/2019 Sanossian
2019/0347433 A1 11/2019 Chakravorty et al.
2019/0370472 A1 12/2019 Hodgman
2020/0012658 A1 1/2020 Ossher et al.
2020/0012796 A1 1/2020 Trepagnieer
2020/0036750 A1 1/2020 Bahnsen et al.
2020/0036751 A1 1/2020 Kohavi
2020/0057857 A1 2/2020 Roytman
2020/0067980 A1 2/2020 Livny
2020/0074084 A1 3/2020 Dorrans
2020/0082080 A1 3/2020 Boulton
2020/0097662 A1 3/2020 Hufsmith
2020/0097663 A1 3/2020 Sato
2020/0110873 A1 4/2020 Rosendahl
2020/0120126 A1 4/2020 Ocepek
2020/0159525 A1 5/2020 Bhalla
2020/0177618 A1 6/2020 Hassanzadeh
2020/0186544 A1 6/2020 Dichiu et al.
2020/0186569 A1 6/2020 Milazzo
2020/0195683 A1 6/2020 Kuppa et al.
2020/0210590 A1 7/2020 Doyle
2020/0213346 A1 7/2020 Shafet
2020/0257792 A1 8/2020 Rivard
2020/0259791 A1 8/2020 Garcia et al.
2020/0274894 A1 8/2020 Argoeti et al.
2020/0285737 A1 9/2020 Kraus
2020/0285952 A1 9/2020 Liu et al.
2020/0314122 A1 10/2020 Jones et al.
2020/0327237 A1 10/2020 Shakarian
2020/0329062 A1 10/2020 Beauchesne
2020/0336497 A1 10/2020 Seul et al.
2020/0351285 A1 11/2020 Eisenkot et al.
2020/0351302 A1 11/2020 Kyle et al.
2020/0351307 A1 11/2020 Vidas et al.
2020/0356665 A1 11/2020 Denney et al.
2020/0364338 A1 11/2020 Ducau et al.
2020/0372129 A1 11/2020 Gupta
2020/0372154 A1 11/2020 Bacher et al.
2020/0380119 A1 12/2020 Correa Bahnsen et al.
2020/0389472 A1* 12/2020 Drapeau ........... B60W 60/0018
2020/0394309 A1 12/2020 Angelo et al.
2021/0006575 A1 1/2021 McLean et al.
2021/0012012 A1 1/2021 Soroush
2021/0034752 A1 2/2021 Canada
2021/0034753 A1 2/2021 Canada
2021/0034895 A1 2/2021 Archibald
2021/0037055 A1 2/2021 Dumont et al.
2021/0067562 A1 3/2021 Kinder et al.
2021/0103663 A1 4/2021 Gadhe
2021/0109797 A1 4/2021 Zhou
2021/0112078 A1 4/2021 Huston, III
2021/0112090 A1 4/2021 Rivera et al.
2021/0133320 A1 5/2021 Havenga
2021/0157926 A1 5/2021 Handurukande
2021/0157945 A1 5/2021 Cobb
2021/0160273 A1 5/2021 Choi
2021/0173930 A1 6/2021 Dahal
2021/0173935 A1 6/2021 Ramasamy
2021/0185057 A1 6/2021 McLean
2021/0192057 A1 6/2021 Helfman
2021/0194853 A1 6/2021 Xiao
2021/0200840 A1 7/2021 Kannan
2021/0211450 A1 7/2021 Aleidan
2021/0216928 A1 7/2021 O'Toole
2021/0226926 A1 7/2021 Crabtree
2021/0226970 A1 7/2021 Ross et al.
2021/0226982 A1 7/2021 Marty
2021/0226983 A1 7/2021 Cunningham
2021/0256113 A1 8/2021 Stott et al.
2021/0258327 A1 8/2021 Felke et al.
2021/0273957 A1 9/2021 Boyer
2021/0281609 A1 9/2021 Crabtree
2021/0306372 A1 9/2021 Koral
2021/0312058 A1 10/2021 Chiarelli
2021/0312351 A1 10/2021 Pourmohammad
2021/0342441 A1 11/2021 Ross
2021/0360007 A1 11/2021 Paquin
2021/0367961 A1 11/2021 Kuppa
2021/0390181 A1 12/2021 McClay
2022/0004643 A1 1/2022 Sloane
2022/0006818 A1 1/2022 Cunningham
2022/0014542 A1 1/2022 Janakiraman
2022/0021691 A1 1/2022 Bhatkar
2022/0038424 A1 2/2022 Liu et al.
2022/0043911 A1 2/2022 Pomerantsev
2022/0070182 A1 3/2022 Bowditch et al.
2022/0070193 A1 3/2022 Konda et al.
2022/0070279 A1 3/2022 Pang
2022/0078203 A1 3/2022 Shakarian
2022/0083644 A1 3/2022 Kulshreshtha
2022/0100868 A1 3/2022 Tarrant
2022/0101326 A1 3/2022 Kim et al.
2022/0159033 A1 5/2022 Mizrahi
2022/0174077 A1 6/2022 Sel
2022/0179908 A1 6/2022 Wei
2022/0191230 A1 6/2022 Morgan
2022/0206819 A1 6/2022 Pokam
2022/0210168 A1* 6/2022 Yavo .................. H04L 63/1433
2022/0210656 A1 6/2022 Shaw
2022/0237764 A1 7/2022 Mullet
2022/0263850 A1 8/2022 Colyandro, Jr.
2022/0263858 A1 8/2022 Bargnesi et al.
2022/0394034 A1 12/2022 Keith
2022/0400135 A1 12/2022 Gamra
2022/0407891 A1 12/2022 Albanese
2022/0414206 A1 12/2022 Hinkle
2023/0021226 A1 1/2023 Bobrov
2023/0021414 A1 1/2023 Kumar
2023/0038196 A1 2/2023 Labreche
2023/0105087 A1 4/2023 Borges
2023/0370486 A1 11/2023 Paquette et al.
2023/0421578 A1 12/2023 Mullins et al.
2024/0031411 A1* 1/2024 Levari ................. H04L 63/1416
2024/0037506 A1* 2/2024 Doley ................... G06F 40/226
2024/0155007 A1 5/2024 Gasiorek et al.

FOREIGN PATENT DOCUMENTS

KR 10-2008-0047826 5/2008
RU 2738344 C1 12/2020
WO WO2007/002749 A2 1/2007
WO WO2007/090605 A1 8/2007
WO WO2010/059843 A2 5/2010
WO WO2016/208159 12/2016
WO WO2021/067238 A1 4/2021

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

SECUREWORKS—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

(56) References Cited

OTHER PUBLICATIONS

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.
Lin, Tsung-Yi, et al.; "Microsoft coco: Common objects in context"; European Conference on Computer Vision, Springer, Cham, 2014; 2014.
Liu, Y., Wang, Q., Zhuang, M. and Zhu, Y.; Reengineering Legacy Systems with RESTFul Web Service; 2008 32$^{nd}$ Annual IEEE International Computer Software and Applications Conference, 2008; pp. 785-790; doi: 10.1109/COMPSAC.2008.89; 2008.
White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.
URLVOID; URLVoid.com; retrieved from archives.org: https: web.archive.org/web/20180730215132/https.://www.urlvoid.com/); Published Jul. 30, 2018.
"Japanese Office Action in JP Application No. 2025-517393", Apr. 22, 2026.
"Extended European Search Report in EP Application No. 23868785.9", Jun. 15, 2026.

* cited by examiner

SYSTEMS AND METHODS FOR DETECTING MALICIOUS EVENTS

TECHNICAL FIELD

This disclosure generally relates to detecting malicious sequences, events, and/or activities; and more particularly, relates to systems and methods for utilizing and/or providing an entity and/or user with a rules platform engine or system to enable the entities and/or users to submit one or more curated sets of malicious sequence or event detection rules and/or for automatic monitoring of malicious events based on the curated sets of malicious sequence detection rules.

BACKGROUND

New types of security threat activities or events in the threat landscape arise on a daily or regular basis. Updating and/or developing new software and/or applications to address such new threat activities often is not cost efficient and requires a highly skilled team understanding both the cyber security field and advanced data-science development techniques.

Threat activities can be detected by aggregating multiple weak signal events occurring close to one other, and alarms generated. However, such events may not always be a cause for an alarm, and often, the alarms for such events may be generic to a broad set of events, and updates to such alarms may require additional resources and time. For example, engineering teams may build software to monitor for such events based on rules determined by security experts. Heuristic algorithms may then be added to such software, after which the software may be run in production, and then, often, will be re-evaluated by security experts who may require changes and updates thereto. Due to continuously changing and/or arising malicious events, these requests to update such software, from security experts, may be frequent, such that a lengthy feedback loop time is created. As a result, the level of effort and time expended by both the engineering side and by the security experts working together during software development lifecycles related to the development of and creation of updates to security software and from security experts and engineers is increased.

Accordingly, it can be seen that a need exists for systems and methods for utilizing and/or providing a user with a rules platform engine or system to enable a user to submit a curated sets of malicious sequence detection rules and/or for automatic monitoring of malicious events based on the curated sets of malicious sequence detection rules. The present disclosure is directed to the foregoing and other related, and unrelated, problems/issues in the art.

SUMMARY

Briefly described, according to various aspects, the present disclosure is directed to systems and methods for detecting security threat activities such as sequences of malicious events. Such systems and methods may comprise or utilize a memory and/or at least one processor. Such a system may comprise (e.g., the at least one processor may comprise) a rules platform engine and/or a malicious sequence detection engine. The rules platform engine may be configured to provide one or more sets of user-readable instructions, defined in a domain specific language or other similar language, to one or more users. The one or more sets of user-readable instructions may be utilized to generate a set of malicious sequence activity or event detection rules or malicious sequence detection rules. In other words, the one or more sets of user-readable instructions may allow or enable a user to generate rules to detect sequences or potential malicious or threat activities or events. Such malicious sequence rules may be defined by one or more malicious or threat activity or event based rules and/or interactions provided by each of the one or more users, or a combination thereof.

In embodiments, the rules platform engine may be configured to receive (e.g., for example, via a user interface or via reception of data through a message based system) one or more curated sets of malicious sequence activities or event detection rules (e.g., in embodiments, one or more sets of conditions indicative of a potential threat, which can be of varying severities, and also referred to herein after as malicious sequence detection rules) and instructions, for generation of alerts for such malicious sequence activities or event based rules, in the defined domain specific language from one or more users. The rules platform engine may further be configured to generate a rules repository. The rules repository generally may be stored separately from the memory of the system, e.g., as a separate repository resident on a separate server, network, memory or at another location. In embodiments, at least a portion of the malicious sequence detection rules can be loaded into the memory, and in some embodiments, a copy of subset of the rules repository further could be stored in the memory. The rules repository may be utilized by other engines or algorithms to continuously scan or substantially continuously scan computing devices for malicious activity or events. Further, one of the one or more malicious sequence detection rules in the rules repository may include one or more draft sets or draft malicious sequence detection rules. In embodiments, one or more conditions of a malicious sequence detection rule can be provided by a service lookup, e.g., an event with an identified potential threat or malicious IP address is received and, using the domain specific language, security experts are provided with a functionality that will reach out to the rules repository for analysis of the event e.g., pulling/accessing a threat service and/or threat database, etc.

Such a system and method may also include a malicious sequence of threat activity or event detection engine or system configured to receive the curated sets of malicious sequence detection rules adapted to analyze and determine a threat score of a series or set of detected threat activities or events that have been aggregated to define a malicious sequence of such threat activities or events that were detected as occurring within a selected or determined time period from one or more users or from the repository (e.g., the malicious sequence detection engine or system may receive updated rules from the repository or rules repository on a regular basis). Using such rules, the malicious sequence detection engine or system may monitor a computer network or system and/or data, such as from incoming security logs, for malicious activities or events or a plurality of weak signal activities or events. Rules indicated to be a draft malicious sequence detection rule may not be utilized by the malicious sequence detection engine or system until the draft malicious sequence detection rule is accepted by or further curated by a user and/or entity. The malicious sequence detection engine or system may aggregate any detected malicious activities (e.g., the plurality of weak signal events) and generate a threat score. If the threat score exceeds a threshold, the malicious sequence detection engine or system may generate an alert (e.g., the alert including the instructions specified by the one or more users).

Thus, the system and methods disclosed herein are adapted to enable and/or provide for a "separation of concerns" for development of security software or applications by which, for example, the responsibilities of a software engineer, enabling engineers, or developers can be carried out in parallel and substantially independently of the review of threat activities or events relating to the software being developed by security experts. The systems and methods allow for independent work and work by each distinct group (e.g., the engineering side versus security expert analysis) without requiring a substantially continuous feedback loop between the engineers and security experts. Thus, developer responsibilities or concerns can be separated from those of a security expert, and correspondingly, the required level of effort and length of product development lifecycles due to continued updates having to be added to a software product in view of numerous security expert requests and/or review of detected events can be reduced (e.g., many security experts' requests and more minor software changes, such as, for example, for an enterprise or organization, may be resolved independently by the security experts communicating with and providing curated security rules to the malicious sequence detection engine of the system, which can implement and thereafter substantially automatically apply and modify the security rules for an associated security software product without a frequent back-and-forth between the security experts and developers/engineers).

By providing a set of expansible, human-readable instructions defined in the domain specific language: (1) security experts may be enabled to provide their own curated set of rules to a sequence detection engine via an interface usable by such security experts (e.g., a user potentially without engineering experience), (2) the security experts may manage non-engineering workflows around the content of sets of curated rules, (3) the security experts or other users may build access control around the curated rules outside engineering system development life cycle, and/or (4) the security experts or other users may use the domain specific sequence rule language to support new, curated security rules or instructions that can be applied by the sequence detection engine to substantially automatically update malicious sequence detection rules applied thereby, such that interaction with context-providing services may provide more appropriate or better contextual information needed most for alerts created by specific malicious sequence detection rules.

In one aspect, the present disclosure provides a system for detecting security threats. The system may comprise a memory. The system may comprise at least one processor. The at least one processor may comprise a rules platform engine. The rules platform engine may be configured to provide a set of user-readable instructions, defined in a domain specific language, to one or more users and/or entities for generating a set of malicious sequence detection rules. The malicious sequence detection rules may be defined by one or more malicious sequence activity based rules and/or interactions provided by each of the one or more users and/or entities. The rules platform engine may be configured to receive one or more curated sets of malicious sequence detection rules and instructions in the defined domain specific language from one or more of the one or more users and/or entities. The rules platform engine may be configured to generate a rules repository stored within and/or separate from the memory, the rules repository including one or more existing the malicious sequence detection rules and being configured to receive and store the one or more curated sets of the malicious sequence detection rules received from the one or more users and/or entities. The at least one processor further may comprise a malicious sequence detection engine. The malicious sequence detection engine may be configured to receive the one or more curated sets of malicious sequence detection rules from the one or more users and/or entities. The malicious sequence detection engine may be configured to monitor incoming security data to detect one or more malicious threat activity or event sequences indicative of at least one security threat based on the one or more curated sets of malicious sequence detection rules. The malicious sequence detection engine may be configured to aggregate a plurality of malicious threat activity or event sequences detected within a predetermined time frame and generating a threat score. The malicious sequence detection engine may be configured to, and if the threat score of the aggregated malicious threat activity or event sequences exceeds a threshold score, generate an alert.

In an embodiment, the rules repository may comprise persistent and secure storage. In another embodiment, the content of the alert may comprise contextual information related to detected malicious sequence activities. The one or more users may comprise one or more of developers, devops, security experts, or combinations thereof. The one or more entities may comprise a host or hosts, servers or other computing devices, accounts (e.g., that may include or contain one or more users), or internet protocol (IP) addresses. One or more of one or more networks, one or more computing devices, or combinations thereof, may be monitored for malicious sequence activities.

In another embodiment, the rules platform engine may be configured to generate a user interface. In such an embodiment, the one or more curated sets of malicious sequence detection rules and instructions in the defined domain specific language may be received from one or more of the one or more users and/or one or more entities via the generated user interface.

In another aspect, the present disclosure provides for a method for detecting malicious sequence activities. The method may include generating one or more malicious sequence detection rules defined in a domain specific language based on interactions provided by each of the one or more users and/or entities. The method may include generating a rules repository configured to receive and store one or more pre-defined rules and to receive and one or more curated sets of malicious sequence detection rules. The method may include receiving, based on an interaction from one or more users and/or entities, one or more curated sets of malicious sequence detection rules. The method may include monitoring one or more networks, one or more computing devices, or combinations thereof, to detect malicious threat activity or event sequences indicative of at least one potential security threat based on the one or more curated sets of malicious sequence detection rules. The method may include aggregating a plurality of malicious threat activity or event sequences detected within a predetermined time frame and generating a threat score. The method may further include, if the threat score of the aggregated malicious threat activity or event sequences exceeds a threshold score, generating an alert based on one of the one or more curated sets of malicious sequence detection rules. The method may include storing the one or more curated sets of malicious sequence detection rules to the rules repository.

In another embodiment, the malicious threat activity or event sequences may comprise aggregated multiple weak signal events occurring within a selected time. The content of the alert may comprise contextual information related to detected malicious sequence activities. In an embodiment, the method may include receiving, from one of the one or more users and/or entities, the content of an alert corresponding to one of the one or more curated sets of rules. The content of the alert corresponding to one of the one or more curated sets of rules may be editable by a user and/or entity that submitted the corresponding one of the one or more curated sets of rules.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

Figure 1:
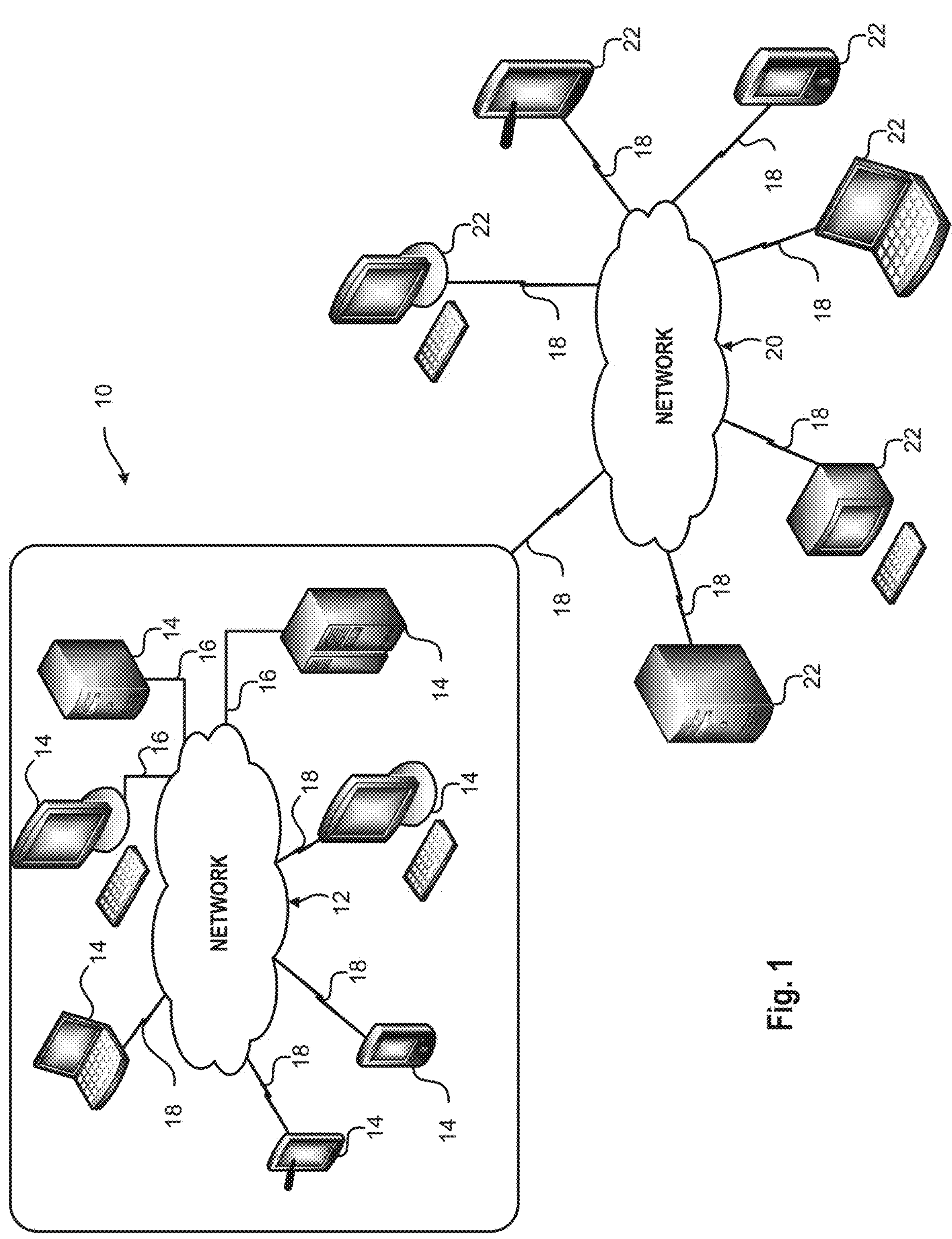
FIG. 1 is a schematic diagram of a data center including a networked system of information handling systems, according to one aspect of the present disclosure.

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

According to various aspects, the present disclosure is directed to systems and methods for detecting malicious sequence events, and more particularly relates to systems and methods for utilizing and/or providing a user and/or entity with a rules platform engine or system to enable a user and/or entity to submit a curated sets of malicious sequence detection rules and/or for automatic monitoring of malicious events based on the curated sets of malicious sequence detection rules, including enabling filtering of sequences of lower risk activities or events to substantially reduce the incidence of alarms being generated for lower risk activities.

In embodiments, such systems and methods may be directed to analyzing incoming security data and detecting malicious threat activities or events that, by themselves, may constitute a low threat risk, but, when occurring in sequences or within a selected time, may create a higher threat risk and/or a stronger indicator of compromise. For example, in embodiments, a series or detected sequence of threat activities or events having a lower assigned threat risk can be aggregated over a selected time window, and if aggregation thereof creates a risk level or factor that exceeds a threshold risk level, and there is not already a detection rule in place that would apply to such a sequence of threat activities or events, the malicious sequence detection engine can alert one or more security experts. In response, the security experts can curate or modify one or more rules applicable to the detected sequence of activities or events and provide such curated rules or events to the malicious sequence detection engine, which can utilize such curated malicious sequence detection rules to automatically apply and/or updated the malicious sequence detection rules stored in the rules repository to later detections of similar sequences of threat activities or events without requiring further expert intervention.

The system and methods may comprise or utilize a memory and/or at least one processor. The system may comprise (e.g., the at least one processor may comprise) a rules platform engine and/or a malicious sequence detection engine. The rules platform engine may be configured to provide one or more sets of user-readable instructions, defined in a domain specific language, to one or more users. The one or more sets of user-readable instructions may be utilized to generate a set of malicious sequence detection rules. In other words, the one or more sets of user-readable instructions may allow or enable a user to generate rules to detect malicious sequence activity or events.

In embodiments, such malicious sequence detection rules may be defined by one or more malicious sequence activity based rules and/or interactions provided by each of the one or more users. The rules platform engine may be configured to receive (e.g., for example, via a user interface or via reception of data through a message based system) one or more curated sets of malicious sequence activity detection rules and instructions, for alerts for malicious sequence activity based rules, in the defined domain specific language from one or more users and/or entities. The rules platform engine may be configured to receive, in another embodiment, draft sets of malicious sequence activity detection rules (e.g., in embodiments, a set of conditions) and instructions. The rules platform engine may further be configured to generate a rules repository. The rules repository may be stored in the memory and/or stored externally (e.g., in an external database). The rules repository may be utilized by other engines or algorithms to continuously scan or substantially continuously scan computing devices and/or other entities (e.g., a host or hosts, servers or other computing devices, accounts (e.g., that may include or contain one or more users), or internet protocol (IP) addresses associated with one or more users) for malicious events. In embodiments, the rules repository may include an indicator to indicate whether a particular rule is a draft rule or ready for production (e.g., to be utilized in a scanning operation).

In embodiments, the system and methods may include a malicious sequence detection engine or system. The malicious sequence detection engine or system may be configured to receive the curated sets of malicious sequence detection rules from one or more users or from the repository (e.g., the malicious sequence detection engine or system may receive updated rules from the repository on a regular basis). Using such rules, the malicious sequence detection engine or system may monitor for malicious events or sequence of events and/or a plurality of weak signal events, e.g., a sequence of such events that may occur over a selected time period. The malicious sequence detection engine or system may aggregate any detected malicious activities and/or sequences of threat activities or events that may be malicious (e.g., a plurality of weak signal events detected as occurring in a series and/or as occurring within a selected time period) and generate a threat score. If the threat score exceeds a threshold, the malicious sequence detection engine or system may generate an alert (e.g., the alert including the instructions specified by the one or more users).

Thus, as noted, the problem of a "separation of concerns" (e.g., the responsibilities of a developer versus a security expert, as well as long level of effort and development lifecycles in development and based on numerous security expert requests and/or review of detected events) may be resolved at scale (e.g., many security experts' requests and many software updates, such as, for example, for an enterprise or organization). In other words, by separating development of such software from requests by security experts, updates regarding monitoring of newly discovered events or sequences may occur automatically and quicker than in a typical software development life cycle.

Further, by providing a set of expansible, human-readable instructions defined by the domain specific language: (1) security experts may be enabled to provide their own curated set of rules to a sequence detection engine via an interface usable by such security experts (e.g., a user potentially without engineering experience), (2) the security experts may manage non-engineering workflows around the content of the rules, (3) the security experts or other users may build access control around the rules outside engineering system development life cycle, and/or (4) use of capabilities of a sequence rule language to support new instructions, such that interaction with context-providing services for curation of the rules by different security experts may provide more appropriate or better contextual information needed most for alerts created by specific malicious sequence detection rules.

As shown in FIGS. 1-5, the present disclosure includes systems and methods for detecting malicious sequences or events. The systems and methods disclosed herein are adapted to enable creation or generation of curated sets of malicious sequence detection rules and/or for automatic monitoring of malicious events or threat activities based on the curated sets of malicious sequence detection rules.

FIG. 1 is a block diagram of an exemplary data center 10 that can be in communication with or incorporated as part of the system and methods for detecting malicious threat activity or event sequences. As shown in FIG. 1, the data center 10 can include a network 12 that may provide communications among a plurality of information handling systems 14, which can include work stations, personal computers, smart cellular telephones, personal digital assistants, laptop computers, servers, computing devices, other suitable devices, and/or combinations thereof. The information handling systems 14 further can be coupled to the network 12 through wired line connections 16, wireless connections 18, or any other suitable lines of communication or connection. As further shown in FIG. 1, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., Wi-Fi, cellular, etc.). The network 12 further can be accessible to/by one or more user or client managed information handling systems or devices 22 to facilitate communication between the client managed information handling systems 22 and the data center 10 for which rules may be generated and/or enforced. The network 12 can include an API interface of the event management center, though the network can include any suitable network, such as the Internet or other wide area network, a local area network, or a combination of networks, and may provide communications, e.g., data communications, among the event management center and the client managed information handling systems 22.

The client managed information handling systems 22 can be connected to the network 20 through wired connections, e.g., an Ethernet cable, or other suitable wired or wireless connections 18, e.g., Wi-Fi_33, Bluetooth®, cellular connections (e.g., 3G, 4G, LTE, 5G, etc.), other suitable wireless connections or combinations thereof (FIG. 1), to enable the clients or operators of information handling systems 22 to communicate with the event management center, e.g., to access one or more services provided thereby. For example, the event management center can be or include a web service.

For purposes of the present disclosure, the information handling systems 14/22 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling systems also may include one or more buses operable to transmit communications between the various hardware components.

Figure 2A:
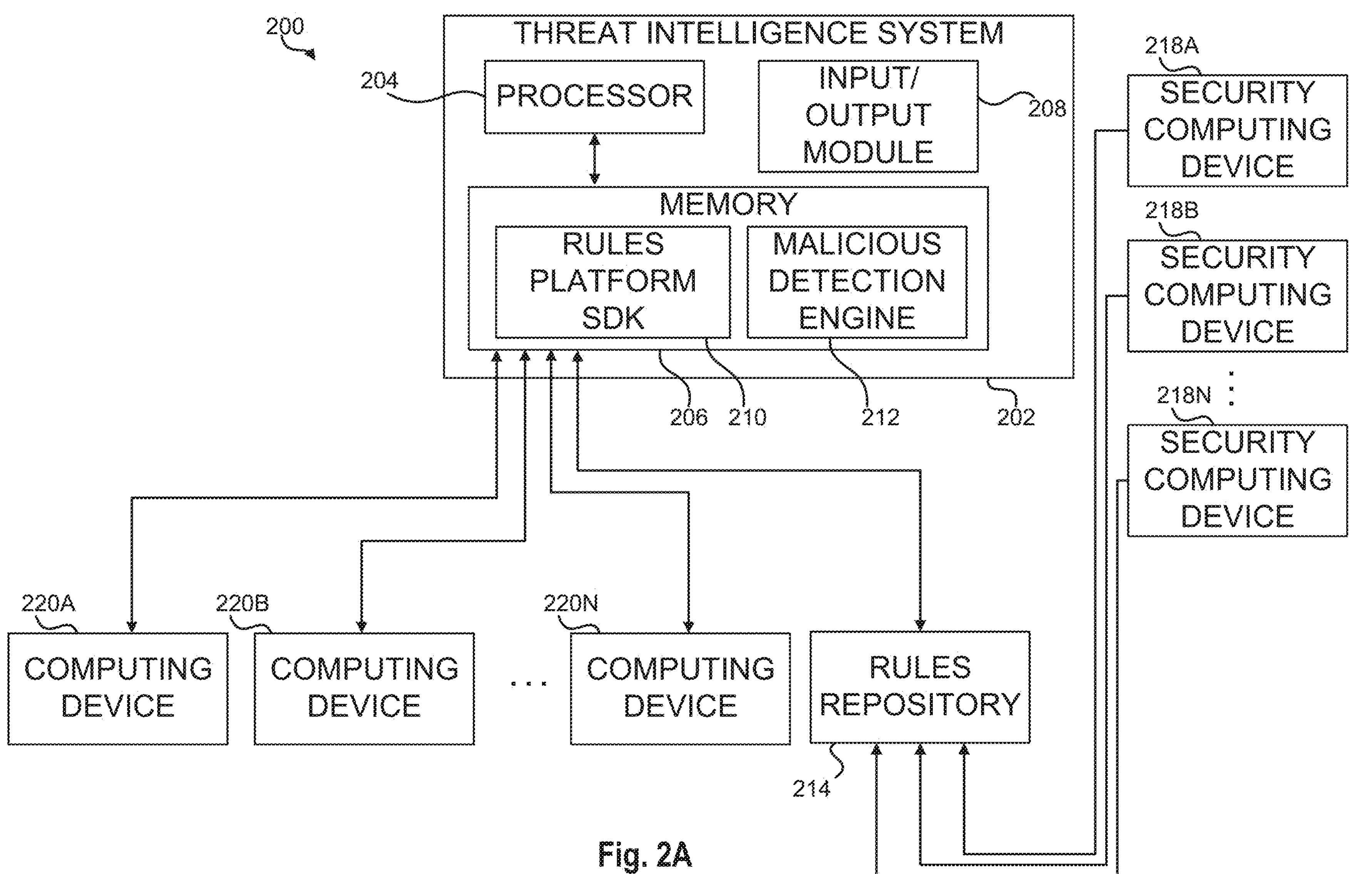
FIG. 2A and FIG. 2B are schematic diagrams of systems for detecting security threats, according to one aspect of the present disclosure.
Figure 2B:
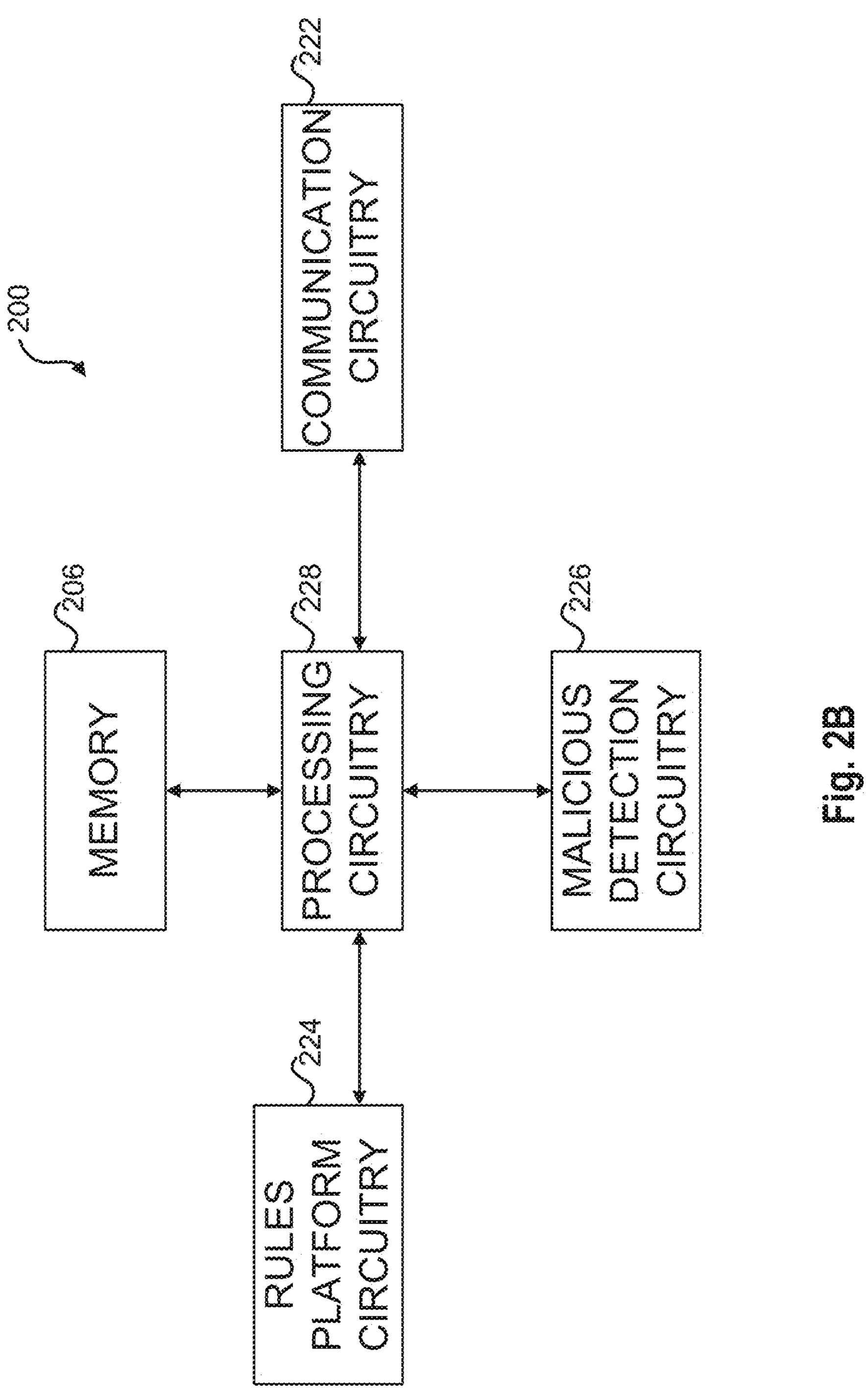

FIG. 2A and FIG. 2B are schematic diagrams of embodiments of a system for detecting malicious sequences of events or threat activities, according to one or more aspects of the present disclosure. Turning to FIG. 2A, the system 200 may include a threat intelligence system 202. The threat intelligence system 202 may include at least one processor 204 and memory 206. The memory 206 may include or store a rules platform engine 210 and/or a malicious sequence detection engine 212. The memory 206, in an embodiment, may include or store a rules repository 214. In another embodiment, the rules repository 214 may be distributed across more than one storage devices (e.g., such as one or more internal/external databases), in addition to or rather than being stored in the memory 206. The threat intelligence system 202 may include other components such as an input/output module 220. In embodiments, the input/output module 220 may be configured to receive and/or transmit data from external sources (e.g., a security computing device 218A, 218B, up to 218N; and/or one or more computing devices 220A, 220B, and up to 220N).

In an embodiment, the processor 204 may execute various instructions stored in the memory 206, such as the APIs or other instructions or programs associated with, corresponding to, or comprising one or more of the rules platform engine 210 or the malicious detection engine 212. In an embodiment, the security computing device 218A, 218B, and up to 218N and/or the computing devices 220A, 220B, and up to 220N may be separate from or not directly included within the threat intelligence system 202. In another embodiment, the threat intelligence system 202 may include one or more security computing devices 218A, 218B, and up to 218N and/or one or more computing devices 220A, 220B, and up to 220N. In addition, or alternatively, the threat intelligence system 202 can include and/or be configured to execute a plurality of instructions associated or corresponding to user interfaces, agents, and/or other monitoring algorithms therewith.

The rules platform engine 210 may be configured to receive one or more draft and/or one or more curated sets of malicious sequence detection rules from each of the security computing devices 218A, 218B, and up to 218N. The rules platform engine 210 may further generate the rules repository 214. The rules platform engine 210 further may be configured to add any received one or more draft and/or one or more curated sets of malicious sequence detection rules to the rules repository 214. The rules platform engine 210 may further include or be configured to generate at least one interface, such as a user interface, configured to receive such one or more curated sets of malicious sequence detection rules, along with instructions for implementation or application of each of the one or more curated sets of malicious sequence detection rules. The instructions may, in addition to or rather than implementation or application details, include information regarding how to handle a security threat, who to send an alarm regarding a qualified threat or sequence of malicious threat activities or events to (e.g., a selected security expert or set of experts), and/or the language included in the alarm, among other data and/or information. In an embodiment, a user and/or entity e.g., via engagement or interaction with the rules engine platform 210) and/or the rules engine platform 210 with or without user interaction, may classify or indicate each user's permission or access level.

In another embodiment, each of the security computing devices 218A, 218B, and up to 218N may connect directly to the rules repository 214. In such an embodiment, each of the security computing devices 218A, 218B, and up to 218N may provide one or more draft and/or one or more curated sets of malicious sequence detection rules directly to the rules repository 214 (e.g., via a user interface and/or other message based system). Further, the threat intelligence system 202 may collect the rules from the rules repository at preselected time intervals or substantially continuously (e.g., via the rules platform SDK 210, the malicious detection engine 212, and/or another algorithm or engine. The threat intelligence system 202 may provide collected rules directly to the rules platform SDK 210 and/or the malicious detection engine 212.

In an embodiment, a malicious sequence detection rule may include events, activities, or occurrences corresponding to a potentially malicious outcome (e.g., if these events occur, a malicious event or threat activity may be occurring). In an embodiment, the malicious sequence detection rule may include events, activities, or occurrences associated with one or more specified users and/or entities. The malicious sequence detection rule may include events based on abnormal behavior, frequency of events, type of events, the user and/or entity (e.g., a host or hosts, servers or other computing devices, accounts (e.g., that may include or contain one or more users), or internet protocol (IP) addresses associated with one or more users) associated with the events, a profile of a user and/or entity associated with the events (e.g., a profile including statistics based on prior collected data associated with a user and/or entity), and/or where and/or how the occurrence takes place (e.g., login on a server running a specified operating system, an operation typically performed on a laptop being performed on a server, etc.). The malicious sequence detection rule may be applicable to aggregated sets or sequences of a plurality of detected threat activities or events that individually are seen as having a low risk score that normally would not necessarily initiate an alarms, but when all or a portion of those plurality of events occur in a sequence, such as within a selected or pre-determined time period, a threat score for the aggregated sequence of such threat activities or events may indicate a higher level threat or that a malicious event is occurring so as to generate an alarm and/or initiate a remedial action.

In yet another embodiment, a user and/or entity may submit a malicious sequence detection rule for testing (e.g., a draft malicious sequence detection rule), prior to submission for use via the malicious detection engine 212. In such embodiments, the rules platform engine 210 may generate a testing or sandbox area. The rules platform engine 210 may execute events in a controlled environment in an attempt to trigger detection. Further, the rules platform engine 210 may utilize actual data (e.g., from a user, a security expert, and/or an external data source) to perform such executions. Thus, a user, an entity, and/or the rules platform engine 210 may determine if a particular malicious sequence detection rule is correctly written and/or interpreted prior to being utilized by the malicious detection engine 212.

The malicious detection engine 212 may, based on one or more curated sets of malicious sequence detection rules stored in the rules repository 214, scan or automatically scan one or more computing devices 220A, 220B, and up to 220N and/or other users and/or entities for corresponding threat activities and/or a series or sequence of events that may or may not be malicious according to the curated sets of malicious sequence detection rules. The malicious detection engine 212 may further scan a network and/or other devices for such threat activities or events. In the case that a series of events corresponds to one or more of curated sets of malicious sequence detection rules, the malicious detection engine 212 may aggregate the series or sequence of events detected over a determined period of time, which can be of a selected type or class of threat activities or events, and generate a threat score. The aggregated series or sequence of detected events, in an example, may include all or a portion of the events described in one or more the curated sets of malicious sequence detection rules. The malicious detection engine 212 may then compare the threat score to a threshold score and, if the threat score exceeds the threshold score, in some embodiments, the malicious detection engine 212 may generate an alarm, and can send the sequence of events to one or more security experts to review. Further, after review by the one or more security experts a new curated rule/rules may be created by the malicious detection engine 212, the rules platform engine 210, and/or by a user or by one or more of the security experts. In other embodiments, where a curated rule applicable to the sequence of events exists in the rules repository 214, the malicious detection engine can apply the rule to take an appropriate action (e.g., classify the events as indicating a threat and initiating a remedial action or alarm, or can determine the sequence of events not likely to be a threat).

As noted above, after review by the one or more security experts a new curated rule/rules may be created by the malicious detection engine 212, the rules platform engine 210, an entity, and/or by a user or by one or more of the security experts. In such examples, events detected may be indicated by text describing the events that occurred, files associated with those events (e.g., emails, documents, etc.), time stamps, and/or identification or identifying data (e.g., usernames, IP addresses, etc.), among other data. When a series or sequence of events (e.g., as specified in a rule) are detected, data associated with the series or sequence of events may be sent to one or more security experts. Further, additional data corresponding to a pre-selected time prior to and after the occurrence of the series or sequence of events may be sent to one or more security experts. Further still, the rules platform engine 210 may receive such data. The rules platform engine 210 may analyze the data (e.g., the data associated with the series of events and the data corresponding to events occurring prior to and after the series of events). The rules platform engine 210 may determine, based on such analysis, new rules and/or updates to existing rules. For example, the rules platform engine 210 may recognize patterns, frequencies, and/or reoccurring identifying details that indicate the malicious event or another malicious event is occurring, and based on this recognition, the rules platform engine 210 may update or add a rule to the rules repository 214. Further, such an update may be transmitted to one or more security experts prior to or after being put into production (e.g., the malicious detection engine 212 actively scanning for such rules).

For example, if a user receives an email (e.g., first weak signal) from an unknown sender (e.g., second weak signal) with a link (e.g., a third weak signal) and then the user proceeds to select the link (e.g., a fourth weak signal), then an alarm may be generated according to a rule in the rules repository 214. The events, in such an example, would be receiving the email, from an unknown user, with a link, and selection of the link. Separately, the events may be innocuous, but, when reviewed together, a security issue may be deemed present. Thus, rather than notifying a security expert for each weak signal, the security expert may be notified when a specified combination is exhibited (e.g., the events in a curated set of malicious sequence detection rule), or when a number of similar/same events occur within a selected time period (e.g., a same email with the same link is received by multiple users on a system, or multiple failed login attempts are detected within a selected time, etc.). Other events may include, but are not limited to, exploration of a website, downloading files, accessing files, receiving email, following links, use of specified IP addresses, use of out of date software, use of software with known vulnerabilities, login attempts, version of an operating system, etc.

In another embodiment, the rules platform engine 210 may allow for a user and/or entity to submit or delete new rules based on access level. The rules platform engine 210 upon receiving such instructions may automatically deploy such updates. In other words, once deployed, new curated sets of malicious sequence detection rules are active/not active and scanned for/no longer scanned for by the malicious detection engine 212.

Turning to FIG. 2B, in an embodiment, the system 200 or apparatus may include processing circuitry 228, memory 206, communications circuitry 222, rules platform circuitry 224, and malicious detection circuitry 226, each of which will be described in greater detail below. While the various components are only illustrated in FIG. 2B as being connected with processing circuitry 228, it will be understood that the system 200 or apparatus may further comprise a bus (not expressly shown in FIG. 2B) for passing information amongst any combination of the various components of the system 200 or apparatus. The system 200 or apparatus further may include programming or instructions configured to execute various operations described herein, such as those described above in connection with FIG. 1 and FIG. 2A and below in connection with FIG. 3 and FIG. 4.

The processing circuitry 228 (and/or co-processor or any other processor assisting or otherwise associated therewith) may be in communication with the memory 206 via a bus for passing information amongst components of the system 200 or apparatus. The processing circuitry 228 may be embodied in a number of different ways and may, for example, include one or more processing devices configured to perform independently. Furthermore, the processing circuitry 228 may include one or more processors configured in tandem via a bus to enable independent execution of software instructions, pipelining, and/or multithreading. The use of the term "processor" may be understood to include a single core processor, a multi-core processor, multiple processors of the system 200 or apparatus, remote or "cloud" processors, or any combination thereof.

The processing circuitry 228 may be configured to execute software instructions stored in the memory 206 or otherwise accessible to the processing circuitry 228. In some cases, the processing circuitry 228 may be configured to execute hard-coded functionality. As such, whether configured by hardware or software methods, or by a combination of hardware with software, the processing circuitry 228 represents an entity or device (e.g., an element that can be physically embodied in circuitry) capable of performing operations according to various embodiments of the present invention while configured accordingly. Alternatively, as another example, when the processing circuitry 228 is embodied as an executor of software instructions, the software instructions may specifically configure the processing circuitry 228 to perform the algorithms and/or operations described herein when the software instructions are executed.

The memory 206 may be a non-transitory machine readable storage medium and may include, for example, one or more volatile and/or non-volatile memories. In other words, for example, the memory 206 may be an electronic storage device (e.g., a computer readable storage medium). The memory 206 may be configured to store information, data, content, applications, software instructions, or the like, for enabling the apparatus to carry out various functions in accordance with example embodiments contemplated herein.

The communications circuitry 222 may include at least one device or circuitry embodied in either hardware or a combination of hardware and software that is configured to receive and/or transmit data from/to a network and/or any other device, circuitry, or module in communication with the system 200 or apparatus. In this regard, the communications circuitry 222 may include, for example, a network interface for enabling communications with a wired or wireless communication network. For example, the communications circuitry 222 may include one or more network interface cards, antennas, buses, switches, routers, modems, and supporting hardware and/or software, or any other device suitable for enabling communications via a network. Furthermore, the communications circuitry 222 may include the processing circuitry for causing transmission of such signals to a network or for handling receipt of signals received from a network.

The system 200 or apparatus generally will include a rules platform circuitry 224 configured to provide a set of user-readable instructions defined by or expressed in a domain specific language. As such, a user may submit new malicious threat activity or event sequences rules or curated malicious sequence activities rules and instructions for monitoring to the system 200 or apparatus (e.g., such a submission occurring via utilization of the set of user-readable instructions). Further, the rules platform circuitry 224 may be configured to generate and/or update a rules repository. The rules repository may be populated with new, identified security threats or malicious threat activity or event sequences and/or curated sequence activities rules.

The rules platform circuitry 224 also may also generate a user interface, a graphical user interface, or web based user interface. The user interface may be configured such that a user (e.g., a security expert) is able to submit curated sequence activity's rules based on that user's access and/or permission levels. In another embodiment, the curated sequence activities rules may be submitted to the rules repository via other communication or interface methods (e.g., via a RESTless API, via direct entry into the rules repository, and/or via another communication interface or method facilitated by the rules platform circuitry 224).

The system 200 or apparatus may include a malicious detection circuitry 226 configured to monitor for malicious events and/or a plurality of weak signal events (e.g., the series of weak signal events indicating an overall malicious event). The malicious detection circuitry 226 may be configured to receive or obtain (e.g., either from the rules platform circuitry 224 and/or the rules repository) the curated sequence of activities. Using the received or obtained curated sequence of events, the malicious detection circuitry 226 may monitor for corresponding events. Such monitoring may occur continuously, substantially continuously, or at selected periods of time or selected intervals. The malicious detection circuitry 226, in response to detection of a series of potentially malicious events, may aggregate the events and then generate a threat score. The malicious detection circuitry 226 may then compare the threat score to a selected threshold score. If the threat score exceeds the selected threshold score, the malicious detection circuitry 226 may generate an alarm. The alarm may include data or instructions as specified by the one or more users (e.g., security expert).

Figure 3:
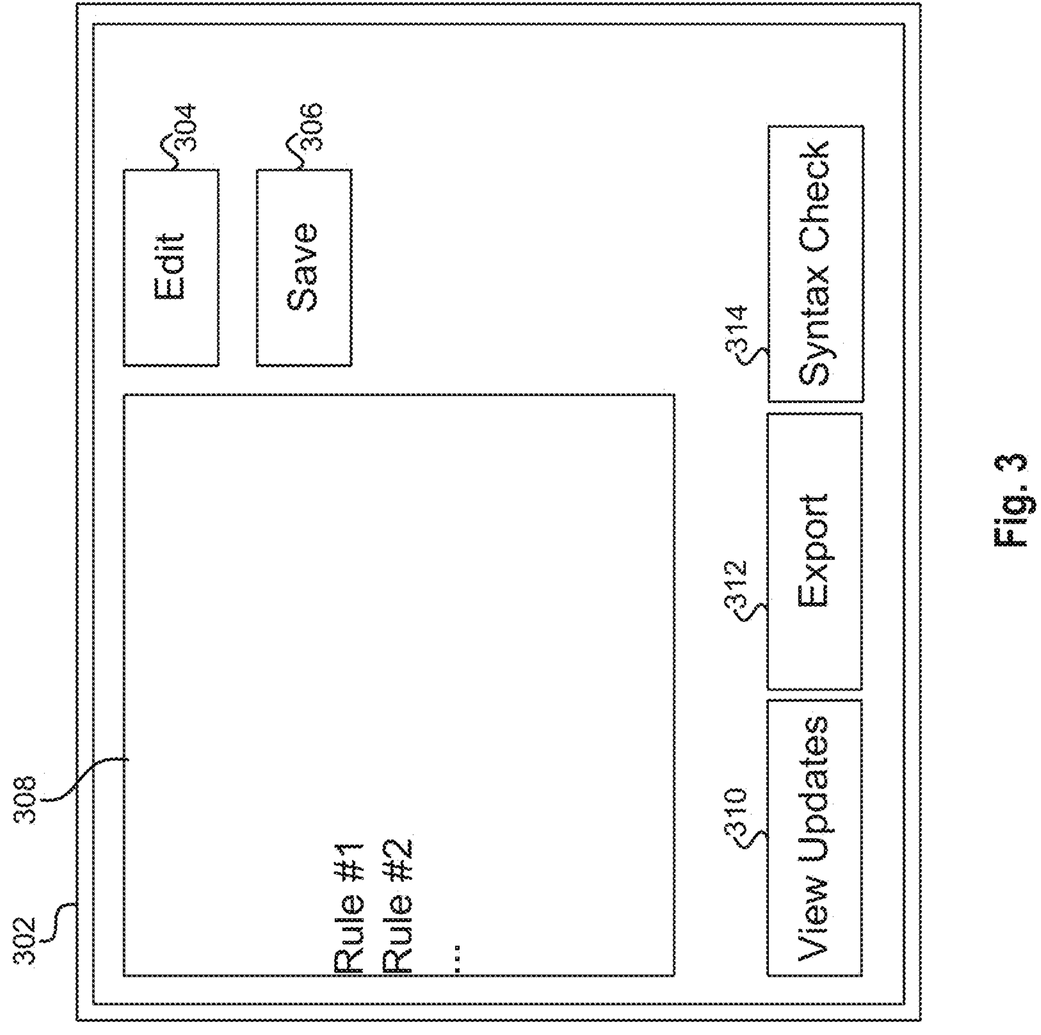
FIG. 3 is a schematic diagram of a graphical user interface for editing and saving a malicious sequence rule or sets of rules, according to one aspect of the present disclosure

FIG. 3 is a schematic diagram of a graphical user interface (GUI) 302 or web-based user interface for editing or updating and saving a malicious sequence detection rule or set of rules, according to one aspect of the present disclosure. The GUI 302, which may be associated with a security expert, may receive one or more of a malicious sequence detection rule or set of rules (e.g., such as from the system 200 or apparatus described above). In addition to receiving one or more of the malicious sequence detection rule or set of rules, the GUI 302 may include a view updates button 310. Upon selection of the view updates button 310, the GUI 302 may display the current set of one or more of a malicious sequence detection rule or set of rules in a rules repository (e.g., see 308). The GUI 302 may include an export button 312. Upon selection of the export button 312, the GUI 302 may cause the currently displayed list of one or more of a malicious sequence detection rule or set of rules to download to a specified location (e.g., a security expert's computing device).

Further, in embodiments, the GUI 302 may include an edit button 304 and a save button 306. Upon selection of the edit button 304 and one of the displayed one or more of a malicious sequence detection rule or set of rules, the GUI 302 may allow the security expert to update or edit the selected one of one or more of the malicious sequence detection rule or set of rules. Alternatively, an edit function or drop-down menu can be accessed upon selection of a displayed malicious sequence detection rule. Upon selection of the save button 306, the edited one of one or more of the malicious sequence detection rule or set of rules may be saved to the rules repository for use in detection of the malicious sequence detection rule or set of rules.

In an embodiment, the GUI 302 may include a syntax check button 314. Once a user edits or updates and/or writes a rule, the user may select the syntax check button 314. Upon selection of the syntax check button 314, a system (e.g., system 200) may scan the edited, updated, or newly written rule and correct the rule based on the domain specific language. In an embodiment, rather than a syntax check button 314, the GUI 302 may include functionality that automatically checks the syntax of a rule and updates the rule and/or provides suggestions on correcting the rule to the user. In another embodiment, the GUI 302 may include dynamic simulation language completion based on the domain specific language. In other words, as a user begins to enter a word or phrase, the GUI 302 may provide and/or suggest a completed word and/or phrase.

In another embodiment, the GUI 302 may be or may include an XML editor, a JSON editor, or another editor configured to enable a user to edit, update, or write a rule. In an example, a user may select a rule and the edit button 304. Upon such a selection, the GUI 302 may open the rule in a text, XML, JSON, or other format editor. The GUI 302 may also include visualizations illustrating correlated events. In such embodiments, the user may select such events to generate a new rule or select some events to add to an existing rule.

Figure 4:
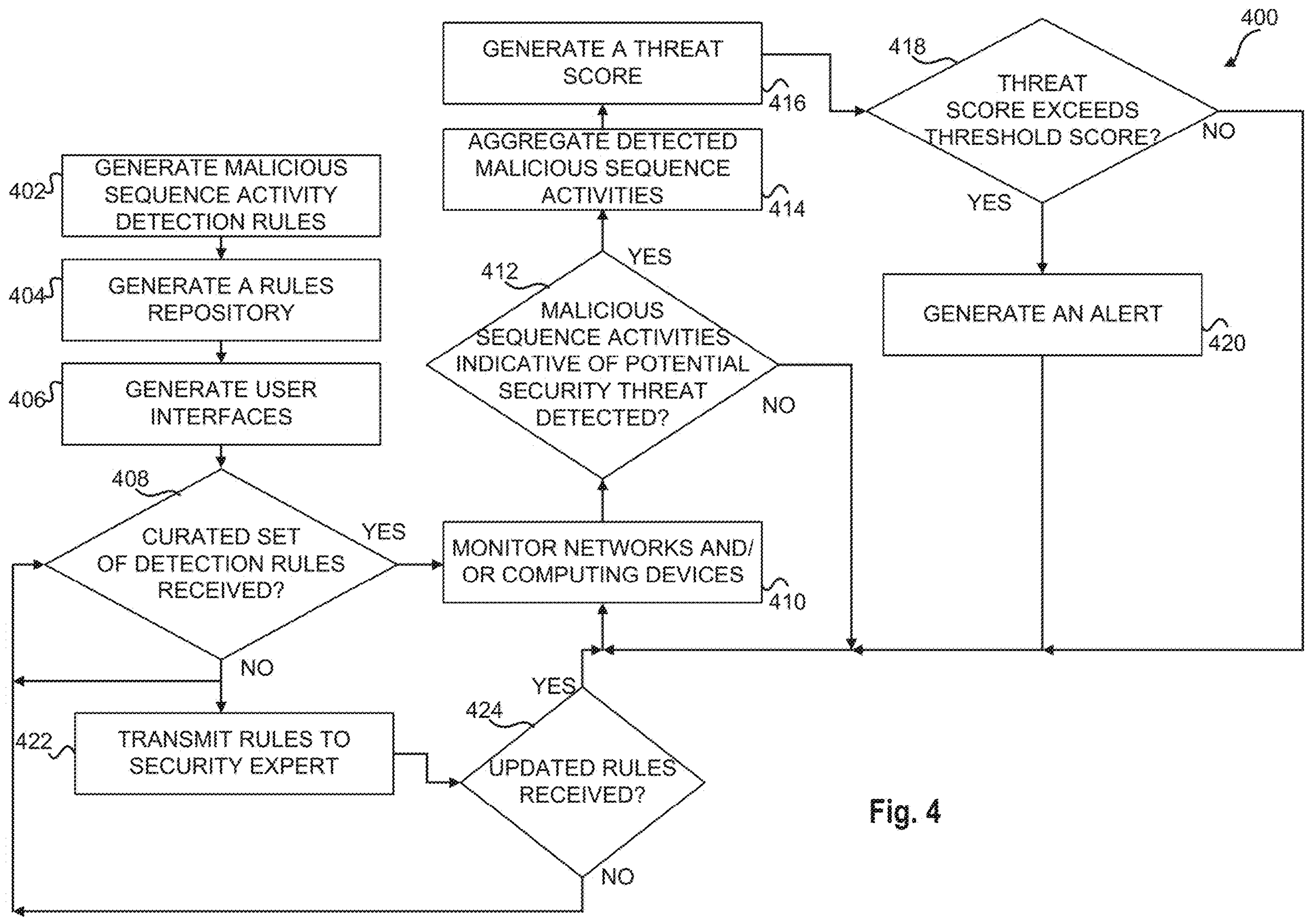
FIG. 4 is a flow diagram for detecting security threats, according to one aspect of the present disclosure.

FIG. 4 is a method/process for detecting malicious events, according to one aspect of the present disclosure. It also will be understood that any of the FIGS. described herein may implement the method 400, in particular FIGS. 1-3. The method 400 may be included in one or more programs, protocols, or instructions loaded into memory of a computing device. The order in which the operations are described is not intended to be construed as a limitation, and any number of the described blocks may be combined in any order and/or in parallel to implement the disclosed methods.

At block 402, a system (e.g., system 200 of FIGS. 2A-2B) may generate a malicious sequence detection rules. Such rules may initially include previously known event sequences indicative of malicious events or intents. The malicious sequence detection rules may be received from one or more sources, such as a user, an entity, a database, a separate repository, a public database or security threat repository (e.g., a threat repository may indicate certain events or conditions that indicate a potential malicious sequence and/or include additional instructions), and/or via an internal data base or repository specific to an organization or enterprise, among other sources. In another embodiment, as noted, the system 200 may generate a malicious sequence detection rule and instructions based on description of certain events or conditions (e.g., such as whitelist/blacklist and/or other threat identification data received from one or more sources). The system 200 may utilize such descriptions to enrich and/or add further information to such rules and instructions.

At block 404, the system 200 may generate a rules repository. The rules repository may be a database and/or a location in the system's memory to store one or more malicious sequence detection rules and/or curated sets of malicious sequence detection rules. The rules repository may be structured as a database. The rules repository may be publicly accessible for reading from, in some embodiments. In another embodiment, the rules repository may not be directly accessible by any user. Rather, in such an embodiment, reading and writing to the rules repository may be enabled and/or facilitated via devices or components of the system 200.

At block 406, the system 200 may, in an embodiment, generate user interfaces. The user interfaces may be generated for each of one or more users. The user interfaces may allow for a user to enter or add a new curated set of malicious sequence detection rules. The user interface may further allow a user to enter instructions in relation to any of the malicious sequence detection rules. The instructions may include messages for an alert, who to message for an alert, and/or other information ensuring the proper data is received by the proper user. In another embodiment, access to the database may occur via an interface (e.g., such as an API) or user interface (e.g., such as a graphical user interface).

As noted, at block 408, the system 200 may determine whether a new curated set of malicious sequence detection rules has been received. Upon reception of a new curated malicious sequence detection rule or set of rules, the system 200 may add the new curated malicious sequence detection rules to the rules repository. In another embodiment, a new curated malicious sequence detection rule or set of rules may be directly added to the rules repository by the security experts. At block 410, the system 20 or apparatus may monitor networks and/or computing devices. The networks may include public networks, private networks, or some combination thereof. Monitoring of a network may include monitoring network devices, including switches, access points, a router, network attached storage, storage area networks, an antenna system, a Bluetooth and/or WiFi transceiver/receiver, or another network device.

At block 412, the system 200 may determine whether malicious threat activity or event sequences indicative of a potential security threat has been discovered or detected. The system 200 or apparatus may scan large numbers of network and/or computing devices. The system 200 or apparatus may scan such networks and/or computing devices via an agent, software, an algorithm, an intrusion algorithm, a monitoring algorithm, and/or some other set of instructions or algorithm configured to monitor one or more networks or computing devices.

At block 414, if a malicious sequence activity has been detected (e.g., such as a series of events, activities, or occurrences indicated in the sets or curated sets of malicious sequence detection rules), then the system 200 or apparatus may aggregate the detected malicious sequence activities. In an embodiment, the detected malicious threat activity or event sequences may include a number of weak signal events. The detected malicious threat activity or event sequences may include events that, when considered separately, may be innocuous. The detected malicious threat activity or event sequences or events may include events corresponding to or specified in one or more of the curated sets of rules or the rules initially added to the rules repository.

In another embodiment, a rule may be selected for application or review by one or more security experts if a part of the detected malicious threat activity or event sequences have been discovered. In an embodiment, the system 200 or apparatus may gather each event detected that corresponds to the malicious sequence activities rules. The system 200 or apparatus may then associate each event that that corresponds to the malicious sequence activities rules with a number or other indicator.

In an embodiment, the malicious sequence activity or other events may be detected by one or more of an agent running on a user's computing device; a plugin corresponding to a user's web browser, email application, and/or other applications on a user's computing device; and/or another monitoring application associated with networks and/or computing devices.

At block 416, the system 200 may generate a threat score. The system 200 or apparatus may utilize the number or other indicator of the aggregated detected events to generate such a score. In another embodiment, the detected events or information corresponding to the detected events may be passed through or applied to a machine learning model and/or probabilistic model to generate the threat score.

At block 418, the system 200 may determine whether the threat score exceeds a threshold score. If the threat score exceeds the threshold score, the system 200 or apparatus, at block 420, may generate an alarm. The instructions included with a particular malicious sequence activities rule may specify where or who to transmit an alarm and/or the information to include in such an alarm.

As noted, the system 200 may transmit one or more of a malicious sequence detection rule or set of rules, for example, at block 422. The system 200, at block 424 may receive any updated malicious sequence detection rule or set of rules from the security expert and, based on those updates, may replace the previous malicious sequence detection rule or set of rules in the rules repository. In another embodiment, the system 200 may update a malicious sequence detection rule or set of rules, based on one or more factors such as, but not limited to, other events occurring within a selected time period of other events specified in the malicious sequence detection rule or set of rules.

Figure 5:
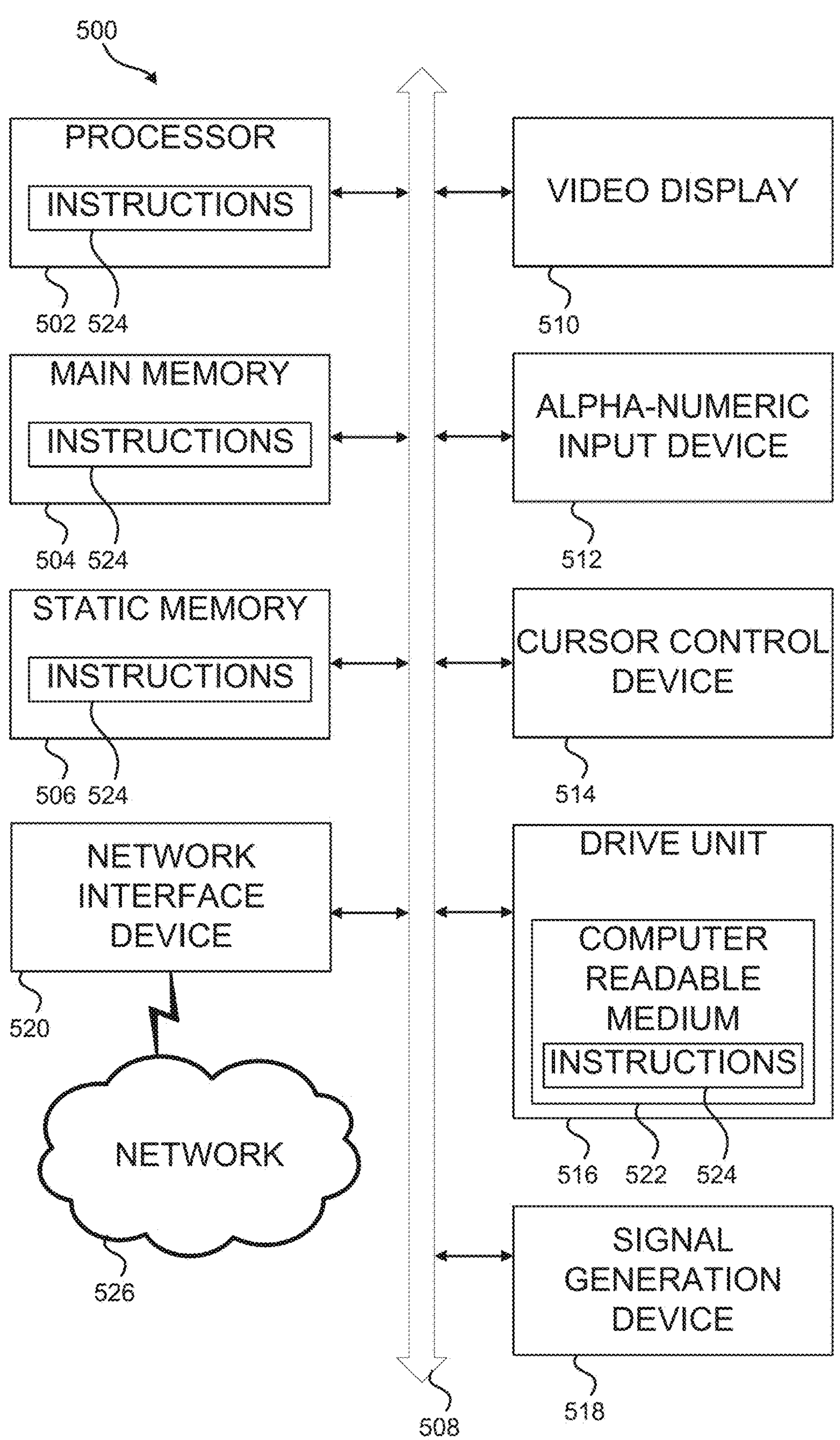
FIG. 5 is a schematic diagram of an information handling system capable of administering each of the specific embodiments, according to one aspect of the present disclosure.

FIG. 5 is a schematic diagram of an information handling system capable of administering each of the specific embodiments, according to one aspect of the present disclosure. The information handling system 500 can represent the systems and methods of FIGS. 1 through 4. The information handling system 500 may include a computer system or processor 502 such as a central processing unit (CPU), a graphics processing unit (GPU), or both. Moreover, the information handling system 500 can include a main memory 504 and a static memory 507 that can communicate with each other via a bus 508. The information handling system 500 includes near-field communications (NFC) device and interface 518, such as an antenna and NFC subsystem. The information handling system 500 can also include a disk drive unit 516, and a network interface device 520. As shown, the information handling system 500 further may include a video display unit 510, such as a liquid crystal display (LCD), an organic light emitting diode (OLED), a flat panel display, a solid state display, or a cathode ray tube (CRT), or other suitable display. The video display unit 510 may also act as an input accepting touchscreen inputs. Additionally, the information handling system 500 may include an input device 512, such as a keyboard, or a cursor control device, such as a mouse or touch pad, or a selectable interface on the display unit. The information handling system may include a battery system 514. The information handling system 500 can represent a device capable of telecommunications and whose can be share resources, voice communications, and data communications among multiple devices. The information handling system 500 can also represent a server device whose resources can be shared by multiple client devices, or it can represent an individual client device, such as a laptop or tablet personal computer.

The information handling system 500 can include a set of instructions that can be executed to cause the processor to perform any one or more of the methods or computer based functions disclosed herein. The processor 502 may operate as a standalone device or may be connected such as using a network, to other computer systems or peripheral devices.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video, or data communication. Further, while a single information handling system 500 is illustrated, the term "system" shall also be taken to include any collection of systems or subsystems that individually or jointly execute a set, or multiple sets, of instructions to perform one or more computer functions.

The disk drive unit 516 or static memory 514 may include a computer-readable medium 522 in which one or more sets of instructions 524 such as software can be embedded. The disk drive unit 516 or static memory 514 also contains space for data storage. Further, the instructions 524 may embody one or more of the methods or logic as described herein. In a particular embodiment, the instructions 524 may reside completely, or at least partially, within the main memory 504, the static memory 506, and/or within the processor 502 during execution by the information handling system 500. The main memory 504 and the processor 502 also may include computer-readable media. The network interface device 520 can provide connectivity to a network 526, e.g., a wide area network (WAN), a local area network (LAN), wireless network (IEEE 802), or other network. The network interface 520 may also interface with macrocellular networks including wireless telecommunications networks such as those characterized as 2G, 3G, 4G, 5G, LTE or similar wireless telecommunications networks similar to those described above. The network interface 520 may be a wireless adapter having antenna systems 532 for various wireless connectivity and radio frequency subsystems 530 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 528 can communicate voice, video, or data over the network 528. Further, the instructions 524 may be transmitted or recei6ed over the network 528 via the network interface device 520. In a particular embodiment, BIOS/FW code 524 reside in memory 504, and include machine-executable code that is executed by processor 502 to perform various functions of information handling system 500.

Information handling system 500 includes one or more application programs 524, and Basic Input/Output System and Firmware (BIOS/FW) code 524. BIOS/FW code 524 functions to initialize information handling system 500 on power up, to launch an operating system, and to manage input and output interactions between the operating system and the other elements of information handling system 500.

In another embodiment (not illustrated), application programs and BIOS/FW code reside in another storage medium of information handling system 500. For example, application programs and BIOS/FW code can reside in drive 516, in a ROM (not illustrated) associated with information handling system 500, in an option-ROM (not illustrated) associated with various devices of information handling system 500, in storage system 507, in a storage system (not illustrated) associated with network channel 520, in another storage medium of the information handling system 500, or a combination thereof. Application programs 524 and BIOS/FW code 524 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The term "computing device" or "system device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used herein to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "non-transitory machine-readable storage medium" is used herein to refer to any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

The term "processor" or "processing circuitry" is used herein to refer to any one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for detecting security threats, comprising:

a memory coupled to at least one processor, the memory comprising:

a rules platform engine configured to cause the at least one processor to perform operations comprising:

provide a set of user-readable instructions defined in a domain specific language to one or more users for generating a set of malicious sequence detection rules, wherein the malicious sequence detection rules are defined by one or more malicious sequence activity based rules and interactions provided by each of the one or more users;

receive one or more curated sets of malicious sequence detection rules and instructions in the domain specific language from one or more of the one or more users;

scan and correct syntax of the one or more curated sets of malicious sequence detection rules and instructions based on a syntax of the domain specific language, wherein correcting the syntax of the one or more curated sets of malicious sequence detection rules and instructions comprises automatically updating the one or more curated sets of malicious sequence detection rules and instructions to correct the syntax of at least one malicious sequence detection rule or at least one malicious sequence detection instruction; and generate a rules repository stored within the memory, the rules repository including one or more existing malicious sequence detection rules and being configured to receive and store the one or more curated sets of the malicious sequence detection rules received from the one or more users; and a malicious sequence detection engine configured to cause the at least one processor to perform operations comprising:

receive the one or more curated sets of malicious sequence detection rules from the one or more users;

monitor incoming security data to detect one or more malicious threat activities or events indicative of at least one security threat based on the one or more curated sets of malicious sequence detection rules;

aggregate a plurality of malicious threat activities or events detected as occurring within a predetermined time period to generate at least one malicious threat activity or event sequence;

generate a threat score for the at least one malicious threat activity or event sequence based on the aggregating the plurality of malicious threat activities or events; and if the threat score for the at least one malicious threat activity or event sequence exceeds a threshold score, generate an alert.

2. The system of claim 1, wherein the rules repository comprises persistent and secure storage.

3. The system of claim 1, wherein the alert comprises contextual information related to the at least one malicious threat activity or event sequence.

4. The system of claim 1, wherein the one or more users comprise one or more of developers, devops, security experts, or combinations thereof.

5. The system of claim 1, wherein one or more of one or more networks, one or more computing devices, or combinations thereof, are monitored by the malicious sequence detection engine for occurrences of malicious threat activities or events.

6. The system of claim 1, wherein correcting the syntax of the one or more curated sets of malicious sequence detection rules and instructions further comprises providing to at least one of the one or more users and via a user interface, suggestions of corrections for the one or more curated sets of malicious sequence detection rules and instructions to correct the syntax of at least one malicious sequence detection rule or at least one malicious sequence detection instruction.

7. The system of claim 1, wherein receiving the one or more curated sets of malicious sequence detection rules and instructions in the domain specific language from the one or more of the one or more users comprises using dynamic simulation language completion based on the syntax of the domain specific language to generate one or more suggestions of a completed word or a completed phrase that complete at least one partially input malicious sequence detection rule or at least one partially input malicious sequence detection instruction and to provide the generated one or more suggestions to at least one of the one or more users.

8. A method for detecting malicious sequence activities, the method comprising:

generating one or more malicious sequence detection rules defined in a domain specific language based on interactions provided by each of one or more users;

generating a rules repository configured to receive and store one or more pre-defined rules and to receive one or more curated sets of malicious sequence detection rules;

receiving, based on an interaction from one or more of the one or more users, the one or more curated sets of malicious sequence detection rules;

scanning and correcting syntax of the one or more curated sets of malicious sequence detection rules based on a syntax of the domain specific language, wherein correcting the syntax of the one or more curated sets of malicious sequence detection rules comprises automatically updating the one or more curated sets of malicious sequence detection rules to correct the syntax of at least one malicious sequence detection rule;

storing the one or more curated sets of malicious sequence detection rules in the rules repository;

monitoring one or more networks, one or more computing devices, or combinations thereof, to detect malicious threat activities or events indicative of at least one potential security threat based on the one or more curated sets of malicious sequence detection rules;

aggregating a plurality of malicious threat activities or events detected within a predetermined time frame to form one or more malicious threat activity or event sequences;

generating a threat score for the one or more malicious threat activity or event sequences based on the aggregated plurality of malicious threat activities or events detected; and if the threat score for the one or more malicious threat activity or event sequences exceeds a threshold score, generating an alert based on one of the one or more curated sets of rules.

9. The method of claim 8, wherein the one or more malicious threat activity or event sequences comprise a specified combination of aggregated multiple weak signal events occurring within a selected time.

10. The method of claim 8, wherein the alert comprises contextual information related to the detected malicious threat activities or events.

11. The method of claim 8, further comprising, receiving, from one of the one or more users, content of the alert corresponding to the one of the one or more curated sets of rules.

12. The method of claim 8, further comprising determining if the detected malicious threat activities or events are subject to the one or more curated sets of malicious sequence detection rules prior to aggregating the detected malicious threat activities or events, and in response to determining that the detected malicious threat activities or events are subject to the one or more curated sets of malicious sequence detection rules, applying at least one applicable malicious sequence rule and initiating a remedial action.

13. The method of claim 8, wherein content of the alert corresponding to the one of the one or more curated sets of rules is editable by a user of the one or more users that submitted the corresponding one of the one or more curated sets of rules via the interaction.

14. The method of claim 8, wherein correcting the syntax of the one or more curated sets of malicious sequence detection rules further comprises providing to at least one of the one or more users and via a user interface, suggestions of corrections for the one or more curated sets of malicious sequence detection rules to correct the syntax of at least one malicious sequence detection rule.

15. The method of claim 8, wherein receiving the one or more curated sets of malicious sequence detection rules in the domain specific language from the one or more of the one or more users comprises using dynamic simulation language completion based on the syntax of the domain specific language to generate one or more suggestions of a completed word or a completed phrase that complete at least one partially input malicious sequence detection rule and to provide the generated one or more suggestions to at least one of the one or more users.

16. A system for detecting security threats, comprising:

a memory coupled to at least one processor, the memory comprising:

a rules platform engine configured to cause the at least one processor to perform operations comprising:

provide a set of user-readable instructions defined in a domain specific language to one or more users for generating a set of malicious sequence detection rules, wherein the malicious sequence detection rules are defined by one or more malicious sequence activity based rules and interactions provided by the one or more users;

receive one or more curated sets of malicious sequence detection rules and instructions in the domain specific language from at least one of the one or more users, wherein receiving the one or more curated sets of malicious sequence detection rules and instructions in the domain specific language from the at least one of the one or more users comprises using dynamic simulation language completion based on a syntax of the domain specific language to generate one or more suggestions of a completed word or a completed phrase that complete at least one partially input malicious sequence detection rule or at least one partially input malicious sequence detection instruction and to provide the generated one or more suggestions to the at least one of the one or more users;

scan and correct syntax of the one or more curated sets of malicious sequence detection rules and instructions based on the syntax of the domain specific language; and generate a rules repository stored within the memory, the rules repository including one or more existing malicious sequence detection rules and being configured to receive and store the one or more curated sets of the malicious sequence detection rules received from the one or more users; and a malicious sequence detection engine configured to cause the at least one processor to perform operations comprising:

receive the one or more curated sets of malicious sequence detection rules from the one or more users;

monitor incoming security data to detect one or more malicious threat activities or events indicative of at least one security threat based on the one or more curated sets of malicious sequence detection rules;

aggregate a plurality of malicious threat activities or events detected as occurring within a predetermined time period to generate at least one malicious threat activity or event sequence;

generate a threat score for the at least one malicious threat activity or event sequence based on the aggregated plurality of malicious threat activities or events; and if the threat score for the at least one malicious threat activity or event sequence exceeds a threshold score, generate an alert.

17. The system of claim 16, wherein correcting the syntax of the one or more curated sets of malicious sequence detection rules and instructions comprises automatically updating the one or more curated sets of malicious sequence detection rules and instructions to correct the syntax of at least one malicious sequence detection rule or at least one malicious sequence detection instruction.

18. The system of claim 16, wherein correcting the syntax of the one or more curated sets of malicious sequence detection rules and instructions comprises providing to the at least one of the one or more users and via a user interface, suggestions of corrections for the one or more curated sets of malicious sequence detection rules and instructions to correct the syntax of at least one malicious sequence detection rule or at least one malicious sequence detection instruction.

19. The system of claim 16, wherein the rules repository comprises persistent and secure storage.

20. The system of claim 16, wherein the alert comprises contextual information related to the at least one malicious threat activity or event sequence.

* * * * *